Jan. 30, 1940.    R. BUNCH    2,188,646
PUMP ASSEMBLY
Filed Sept. 29, 1937    2 Sheets-Sheet 1
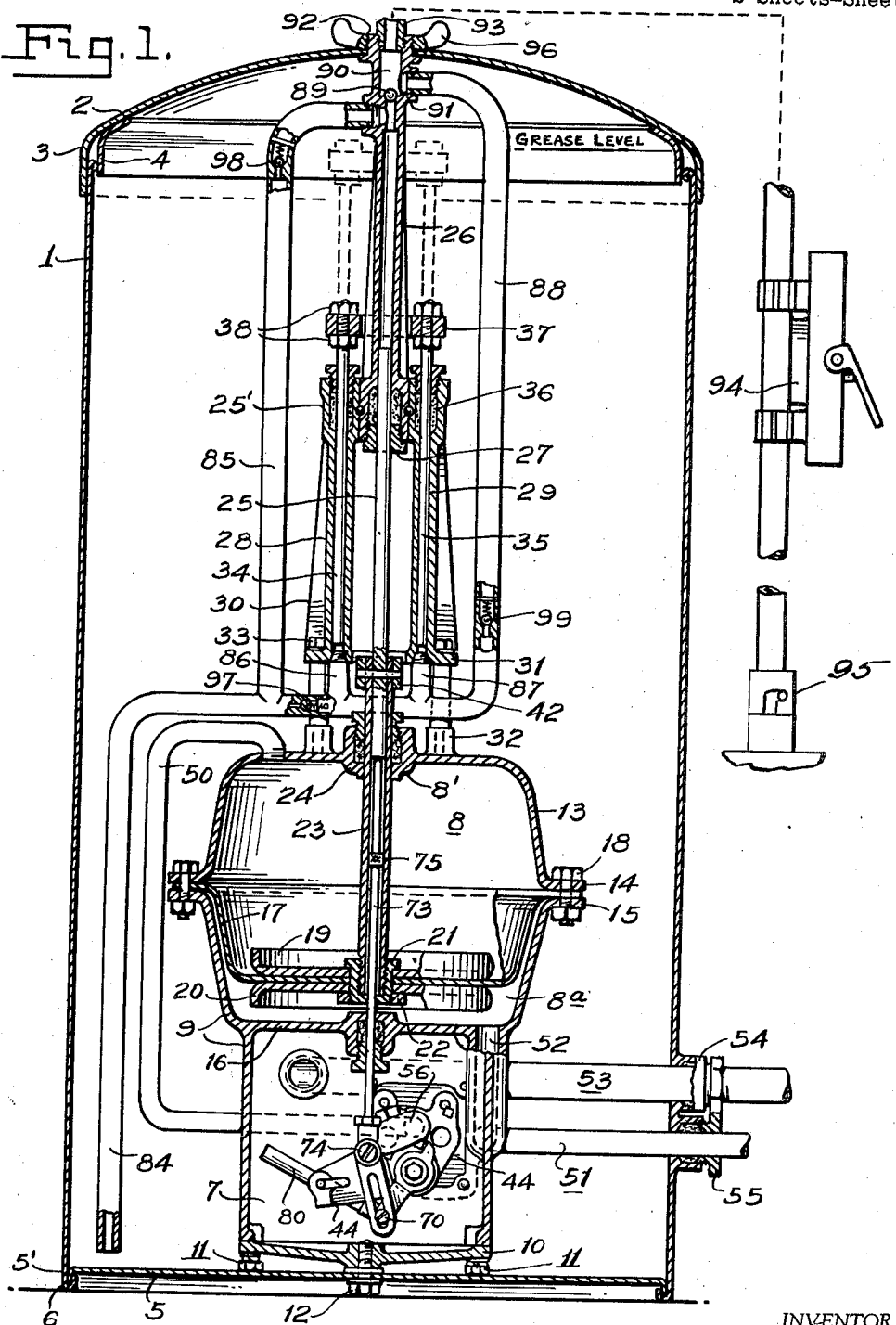
INVENTOR.
Ray Bunch
BY
Martin ⌀ Smith
ATTORNEY.

Jan. 30, 1940.　　　　　R. BUNCH　　　　　2,188,646
PUMP ASSEMBLY
Filed Sept. 29, 1937　　　2 Sheets-Sheet 2
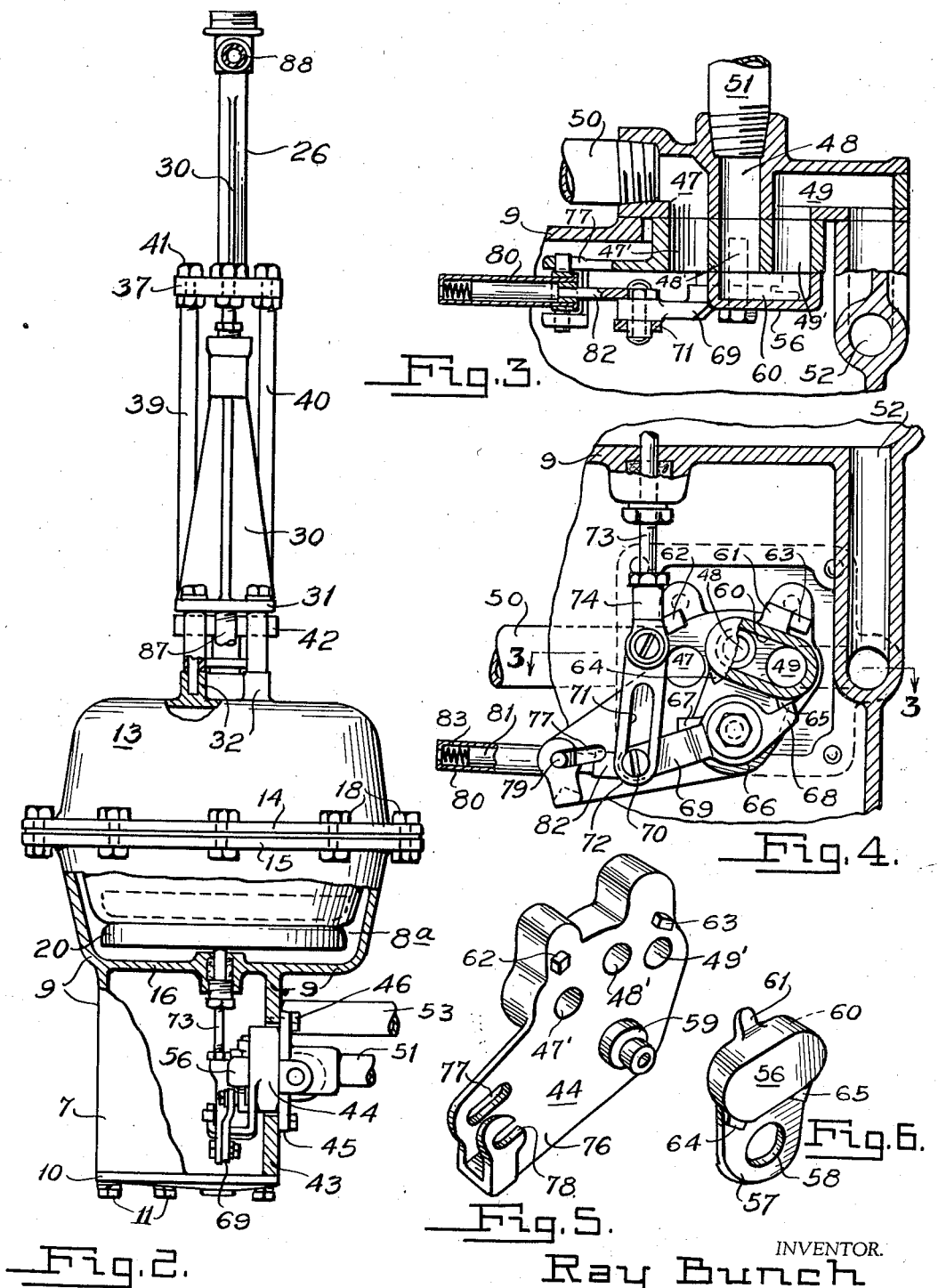
INVENTOR.
Ray Bunch
BY Martin P. Smith
ATTORNEY.

Patented Jan. 30, 1940

2,188,646

UNITED STATES PATENT OFFICE 2,188,646

PUMP ASSEMBLY

Ray Bunch, Los Angeles, Calif.

Application September 29, 1937, Serial No. 166,320

4 Claims. (Cl. 221—80)

The purpose of this invention is to provide a mechanism capable of effectively forcing lubricant into bearing parts of machinery and it has particular use in lubricating automotive parts in that vehicles are often far from stations having proper facilities to force lubricant into all bearing surfaces. To effectively grease automotive parts, the grease must be under high pressure, and ordinarily sufficient pressure is not available in rural districts.

The device herein described has been designed especially for carriage upon trucks and automobiles so that they can be lubricated thoroughly and quickly while in the field or on the road. Construction work necessitating the use of mobile machinery in rural districts where modern lubricating means are not available, has made it necessary to evolve a system of this kind, and I have particular reference to districts where new roads, dams and canals are being constructed and where lumbering is engaged in.

Applicant's invention is not limited to the feeding of lubricant, but can be used for feeding fuel and other light liquids to desirable places, for instance: in keeping a container supplied with fuel as a carburetor in an automobile, or directly feeding fuel into a furnace or other place where it is burnt.

The uses to which such a pumping device can be successfully employed are unlimited. Applicant anticipates its use as a power means in the operation of controlling and synchronizing devices useful in submarines, dirigibles, aeroplanes, battleships, army tanks and even in hospitals for application of pressures and vacuums in the treatment of various ailments requiring pulmotors and other equipment which are coming more and more into general use.

Heretofore, diaphragm type of pumps have been in extensive use and required rather frequent renewal of parts because the operating means were mechanical and slight wear would put the pump out of service. Applicant's pump is designed to avoid such wear in that it operates through the differentiation of air pressures, thus rendering much longer service.

An object of the invention is the provision of lubricating means suitable for carriage upon trucks and automobiles for lubricating automobiles, trucks and road machinery, power shovels, draglines, tractors and the like.

Another object of the invention is the production of an effective and long-lasting feeding device for forcing liquids or fluids into containers or places of service and use.

Still another object is to produce an apparatus having long life for feeding fuel to internal combustion engines, also for lubricant to all bearing surfaces.

Other objects will appear from the reading of the specification, preamble and the claims.

The following description, taken with the drawings, show one form of the invention to enable one skilled in the art to make and use the same, but it is to be understood, that the specification and drawings are not to limit the scope of the invention in any manner whatsoever, except as limited by the appended claims.

Figure 1 of the drawings show a longitudinal section of an assembly for applying pressure to a lubricant to be conducted to bearing surfaces.

Figure 2 shows an elevation partly in section of the lubricant pumping means and associate parts.

Figure 3 shows in section a detail of the valve mechanism taken substantially on the line 3—3 of Figure 4.

Figure 4 shows an elevational view of the valve partly in section.

Figure 5 shows a valve detail in perspective view, and

Figure 6 shows another detail of the valve in perspective view.

As shown in Figure 1, casing or cylinder 1, of metal or other suitable material, has a top or cap 2 which is removable from the cylinder, the top being provided with integral flanges 3 and 4 spaced apart to receive the top end of the cylinder in telescoping relation so as to make a tight fit. The cover may be provided with a vent, if desirable. The bottom 5 is fixed to the cylinder 1 by any suitable means, but in this case, it is held to the cylinder by the crimped section 6 which engages the entire flange 5' of the periphery of the bottom.

This casing or cylinder holds fuel or lubricant which may be any of the hydrocarbons, such as gasoline, grease, oil or another known lubricating or fuel substance. The bottom of the cylinder must, therefore, be liquid tight and any suitable filler or packer may be used above the joints to make it so.

Within the cylinder and emerged in the lubricant is the pumping and valve assembly now to be described.

The pump and valve assembly has a base chamber 7 and motor chambers 8 and 8a on opposite sides of a reciprocating element, superimposed thereon. The bottom of the chamber 7 has a closure plate 10 held to the bottom of the chambers 7 by bolts 11 in an obvious manner. In the center of this plate, a boss is provided to receive a bolt 12 which passes through the bottom 5 of the cylinder so as to hold the valve and pump assembly in a central position with respect to the cylinder. The motor chamber 8 has a top wall section 13 configurated as an inverted cup which is provided with flanges 14 to be fastened to flanges 15 of the wall section 9. The chambers 8 and 7 are separated by the wall 16 which wall may be integral with the walls 9. In the chamber 8 there is provided a motor having a reciprocating element or flexible diaphragm 17, which has its outer periphery tightly held between the flanges 14 and 15 as by the nut and bolts 18 which are spaced entirely around the flanges 14 and 15. If gaskets should be found necessary, they may be placed between the diaphragm and the flanges 14 and 15 in order to insure a hermetic seal. The diaphragm 17 may be made of any suitable gas impervious material which has sufficient flexibility to freely reciprocate in the chambers 8 and 8a for a long period of time without breaking down. Such a material may be any of the well known specially treated fabrics.

In order to give stability and rigidity to the central portion of the diaphragm and make it suitable for anchorage to other operating parts, metallic pan-like washers 19 and 20 are provided upon both sides of the diaphragm and held together by the internally and externally threaded sleeve unit 21 having the nut 22.

Screwed to the inner part of the sleeve unit is a tube 23 which extends through a packing gland 8' at the top of the chamber 8 and has fixed to its outer end a plunger rod 25 which extends through a head 25' and reciprocates in an upper tubular cylinder 26 which is fixed to the head. A packing gland 27 is provided where the plunger enters the tubular cylinder. Fixed upon opposite sides of the head 25' and depending therefrom are cylinders 28 and 29 which have fin-like stiffeners 30 and flanges 31 which are fixed to bosses 32 of the element 13 as by extended bolts and sleeves 33. Within the cylinders 28 and 29 are pistons or plungers 34 and 35 respectively which pass through the upper packing gland assembly 36. The upper and outer ends of these pistons are fixed to a travelling yoke 37 as by nuts 38 screwed upon the threaded ends of the pistons.

The travelling yoke 37 is of annular configuration and has fixed thereto push rods 39 and 40, better shown in Figure 2, and these rods have reduced diameters at their upper ends for reception in bores of the yoke 37 and are provided with nuts 41 which fix them to the travelling yoke. The bottom ends of the rods 39 and 40 are fixed to an elongated yoke 42 as by bolts or welding and has its center bored to receive the tube 23 in any suitable manner as by a welded or threaded connection.

The apparatus just described is so designed and connected that the plungers 25 and 34 and 35 reciprocate in unison with the diaphragm 17 so that when the plunger 25 is on its suction stroke in cylinder 26, the plungers 34 and 35 are on their compression stroke.

The chamber 7 is an air chamber semi-cylindrical in shape and has a flat wall 43 on one side upon which is fixed and supported the valve which controls the operation of the diaphragm 17. This valve includes a casing 44, better shown in Figure 5, which has a plate 45 fixed thereto in any suitable manner, see Figure 2, the plate having holes through which are passed bolts 46 which screw into the wall 43 to support the entire valve assembly.

The valve casing is provided with passages 47, 48 and 49 which open to the inner face of the casing to form ports 47', 48' and 49' and the other ends open to ducts or pipes 50, 51 and 52 respectively; the pipe 50 extending to and through the upper wall of the chamber 8a, the pipe 51 extending through the wall of the cylinder 1 to suitable power means which is, preferably, a vacuum pump or the vacuum system of an internal combustion motor, and the duct 52 extends to the chamber 8a beneath the diaphragm 17. A pipe 53 extends through the wall of the cylinder 1 and into the chamber 7, as shown. The pipes 51 and 53 where they pass through the wall of the cylinder are provided with suitable packing glands 54 and 55 to prevent the contents of the cylinder from escaping through the wall at these points.

A reciprocating or swing slide valve 56, shown in Figure 6, has an ear section 57 with a bore 58 which is pivoted to a fixed bearing pin 59 which permits the element 56 to slide in a path across the ports 47', 48' and 49'. This slide valve element has a cavity 60 which has sufficient longitudinal length to bridge any two of the adjacent ports 47', 48' and 49' so as to permit either the ports 47' and 48' to be in connection for passage of fluid therethrough, or to bridge the ports 48' and 49' to permit passage of fluid through them.

To prevent the slide valve from going beyond certain predetermined limits, a finger 61 is provided rigidly fixed thereto as shown which rides in the limited space between the stops 62 and 63 which are fixed to the valve casing.

The sliding valve is provided with beveled push bosses 64, and 65 to be engaged by a rocking element 66; the element 66 being provided with spaced fingers 67 and 68 at a predetermined angle from one another, substantially as shown, so that the finger 68 will force the slide valve to connect ports 47' and 48' whereas the finger 67 when in contact with the boss 64 will force the slide valve in position to connect the ports 48' and 49'.

To reciprocate the element 66, an arm 69 is fixed thereto, as shown, which is provided with a fixed pin 70 at one end thereof, the pin 70 riding in an elongated slot 71 of a link 72 which has one end pivoted to the lower end of a push rod 73 by the eye connector and pin 74. Push rod 73 reciprocates in the tube 23 and carries a collar 75 that is secured to rod 73 by pin or otherwise. By this arrangement, the slide valve is rocked to and fro when the diaphragm 17 is raised and lowered; the slot 71 permitting sufficient free play to prevent movement of the slide valve until the diaphragm 17 is near its upper or lower position.

An extension 76 of the valve case, see Figure 5, is provided with a slot 77 and an open slotted post 78 so positioned to one another so as to receive a trunnion 79 which is fixed to a tube 80 having an open and a closed end. Within the tube is a plunger 81 having one end thereof fixed to a slotted connector coupling 82 which is pivoted to the pin 70. The plunger 81 is continually urged outwardly from the tube by a compression spring 83 at the closed end of the tube. By this arrangement, as can readily be seen, the slide valve 56 is urged into a position to cover ports 47' and 48'. The said ports not being disconnected until the push rod 73 is forced upward by the diaphragm 17.

When ports 47' and 49' are not covered by the slide valve 56, atmospheric air is admitted to said ports since they are open to the chamber 7 which is always connected to atmosphere by the pipe 53. When ports 47' and 48' are connected together by the slide valve, air is drawn through the passage 47, pipe 50 and from above the diaphragm 17, because the port 48' is connected to the passage 48" and the pipe 51 which is connected to the vacuum system of the engine.

This connection will raise the diaphragm 17 because when the slide valve is in this position, the port 49' is open to the atmospheric chamber 7, and this permits atmospheric pressure to enter beneath the diaphragm 17 by the way of passages 52 and 49. When the slide valve is covering ports 48' and 49', the reverse operation of the diaphragm takes place in that the air is sucked from beneath the diaphragm via passages 52, 49, 48 and 51 and atmospheric air is admitted to the port 47' which conducts the atmospheric pressure via pipe 50 into the top of the chamber 8a.

A pipe 84 may be connected to any supply of the fluid to be pumped, but in the present case, the open receiving end of such pipe is slightly spaced from the bottom 5 of the cylinder 1 which contains the lubricant, and branches out to form pipes 85, 86, 87 and 88. The top of the cylinder 26 is configurated and arranged to receive one end of the pipe 85 and also to form a seat for a ball valve 89 which operates in a chamber 90 of an extended part 91 of the cylinder 26. The extension 91 is provided with pipe connecting means for the pipe 88, and is threaded internally and externally at 92. The internal threads receive a flexible pipe 93 through which lubricant is pumped from the described apparatus. The end of the flexible pipe may carry a hand valve 94 having a nozzle or teat 95 to fit various lubricant connections of the device to be lubricated in a manner well known. Obviously, the teat would be dispensed with when the pump is put to other uses.

The external threaded part of the fitting 91 receives a wing nut 96 for holding the cover 2 tightly upon the cylinder 1. Pipes 86 and 87 connect respectively to the bottoms of the cylinders 34 and 35. A section of the pipe 84 between pipes 85 and 86 is provided with a well known spring check valve 97. Similar check valves are also provided in pipes 85, as shown at 98, and in the pipe 88, as shown at 99, so as to permit the lubricant to move in one direction only, toward the flexible pipe 93.

By the elements just described, it can readily be seen that when the pistons 34 and 35 are pushed upwardly by the diaphragm 17, that lubricant will be drawn in to the cylinders 28 and 29, and at the same time, whatever lubricant may be in the cylinder 26 will be forced outwardly into the pipe 93 by the upward stroke of plunger 25; the check valves 98 and 99 preventing back flow of the lubricant through the pipes 85 and 88. When the diaphragm 17 is lowered, however, plunger 25 will draw lubricant into the cylinder 26 via pipe 85 while the plungers 34 and 35 will force lubricant out of their respective cylinders through the pipes 86 and 87 and 88 into the fitting 91, and hence into and through the pipe 93. By such a continual feed of the lubricant through the pipe 93 under pressure, depending upon the degree of vacuum through the pipe 51 and the area of its respective motive parts, high pressure lubricant is always available to be shot to the bearing surfaces of the various devices to be lubricated.

The face areas of both plungers 34 and 35 are approximately equal to the face area of plunger 25 so that the downward and upward stroke of the pump do an equal amount of work by moving an approximate amount of lubricant. This equality of stroke areas causes the pump to operate in perfect balance and thus avoids shocks and wear upon the connected moving parts.

The relatively large area of the diaphragm of the motor in chambers 8 and 8a gives the pump, which if of relatively small area, great force which results in placing the lubricant in flexible pipe 93 under high pressures.

A differential of pressures of about three pounds between atmospheric air and a partial vacuum over diaphragm area of only about eighteen inches would mean an approximate force of fifty-four pounds on each stroke. Although pipes 51 and 53 are disclosed as being connected to vacuum and atmosphere, respectively, it is to be understood that air or other fluid under pressure may be utilized as power for operating the motor. The pipe 53 can be connected to a fluid pump and the pipe 51 to atmosphere and the device successfully operated for the purposes intended.

Thus it will be seen that I have provided a pump assembly that is relatively simple in construction, inexpensive of manufacture and very effective in performing the functions for which it is intended.

It will be understood that minor changes in the size, form and construction of the various parts of my improved pump assembly may be substituted for those herein shown and described without departing from the spirit of my invention, the scope of which is set forth in the appended claims.

I claim as my invention:

1. In a fluid transporting and moving apparatus, a portable housing adapted to contain fluid to be transported and moved, a fluid pressure tight casing secured within the bottom of said housing and providing a base for the fluid moving apparatus, said casing enclosing a valve, a housing secured to and superimposed on the valve casing and enclosing a motor controlled by the valve, a unit comprising a plurality of pumps fixed to the top of the superimposed housing, means connecting the motor with the pumps to operate the latter, a supply pipe leading to said pumps from a reservoir of low pressure fluid and a conduit leading from the pumps to a valve device.

2. The apparatus recited in claim 1, said means comprising a hollow reciprocating tube, a rod concentrically arranged in the tube and connected to the valve for timing its operation.

3. In a fluid feeding device, a pump and a motor connected in direct relation with each other, said pump having one or more crossheads which operate one or more plungers for moving fluid, said motor having an element which reciprocates and operates the pump, a valve operated by the reciprocation of said reciprocating element and controlling fluid pressure on either side of the reciprocating element so as to cause it to reciprocate, a fluid pressure tight housing enclosing said valve, an air conduit connected to said housing, a fluid pressure tight housing enclosing the pump reciprocating means, a vacuum duct communicating with the housing for the pump reciprocating means, a duct connecting the valve with the housing for said pump reciprocating means and a portable container for fluid or liquid lubricant, which container encloses and provides a protective housing for the valve housing, the housing for the pump reciprocating means and said pump.

4. In a fluid feeding device, a pump and a motor connected in direct relation with each other, said pump having one or more crossheads which operate one or more plungers for moving the fluid, said motor having an element which reciprocates and operates the pump, a valve operated by the reciprocation of said reciprocating element and controlling fluid pressure on either side of the reciprocating element so as to cause it to reciprocate, one of said crossheads being connected with a plurality of plungers and another crosshead being connected with a single plunger and which latter has a face area equal to the combined face areas of the other plungers.

RAY BUNCH.